United States Patent

Utecht et al.

[11] Patent Number: 6,057,404
[45] Date of Patent: May 2, 2000

[54] POLYMERS CONTAINING β-HYDROXYALKYLVINYLAMINE UNITS, PREPARATION AND USE THEREOF

[75] Inventors: Jens Utecht, Neulussheim; Manfred Niessner, Schifferstadt; Dietmar Mönch, Weinheim; Martin Rübenacker, Altrip, all of Germany

[73] Assignee: BASF Aktiengesellschaft, Ludwigshafen, Germany

[21] Appl. No.: 09/091,842

[22] PCT Filed: May 2, 1997

[86] PCT No.: PCT/EP97/02251

§ 371 Date: Jul. 1, 1998

§ 102(e) Date: Jul. 1, 1998

[87] PCT Pub. No.: WO97/42229

PCT Pub. Date: Nov. 13, 1997

[30] Foreign Application Priority Data

May 6, 1996 [DE] Germany .................. 196 17 983

[51] Int. Cl.[7] .................................................. C08F 222/22
[52] U.S. Cl. .................... 525/328.2; 525/383; 525/385
[58] Field of Search .................... 525/328.2, 383, 525/385

[56] References Cited

U.S. PATENT DOCUMENTS

| | | |
|---|---|---|
| 4,217,214 | 8/1980 | Dubin . |
| 4,778,725 | 10/1988 | Serizawa et al. . |
| 5,246,984 | 9/1993 | Darwen et al. . |
| 5,324,787 | 6/1994 | Pinschmidt, Jr. et al. ........... 525/328.2 |
| 5,350,784 | 9/1994 | Darwen et al. . |

FOREIGN PATENT DOCUMENTS

| | | |
|---|---|---|
| 0 071 050 | 7/1982 | European Pat. Off. . |
| 0 216 387 | 9/1986 | European Pat. Off. . |
| 0 223 222 | 11/1986 | European Pat. Off. . |
| 43 39 193 | 11/1993 | Germany . |

OTHER PUBLICATIONS

Ikemura, Kobunshi Kagaku, 26 (288), (1969) 306–310.

*Primary Examiner*—Melvyn I. Marquis
*Attorney, Agent, or Firm*—Oblon, Spivak, McClelland, Maier & Neustadt, P.C.

[57] ABSTRACT

Polymers containing β-hydroxyalkylvinylamine units, which are obtainable by reacting polymers containing vinylamine units with epoxides of the formula

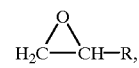

where $R=C_2-C_{28}$-alkyl, phenyl, $C_1-C_{18}$-alkylphenyl or $C_2-C_{18}$-alkenyl, are described, as are a process for preparing the polymers and use of the polymers as retention and drainage aids and flocculants and as fixatives in paper making, as protective colloid for producing alkyldiketene dispersions or alkenylsuccinic anhydride dispersions, as emulsifier for producing aqueous filler suspensions and as corrosion inhibitor.

9 Claims, No Drawings

POLYMERS CONTAINING β-HYDROXYALKYLVINYLAMINE UNITS, PREPARATION AND USE THEREOF

The invention relates to polymers containing β-hydroxyalkylvinyl-amine units, which are obtainable by reacting polymers containing vinylamine units with epoxides, a process for their preparation and their use as retention and drainage aids and flocculents and as fixatives in papermaking, as protective colloid for producing alkyldiketene dispersions, as emulsifier for producing aqueous filler suspensions and as corrosion inhibitor.

U.S. Pat. No. 4,217,214 discloses the preparation of polyvinylamine hydrochloride and its use as flocculent for water-suspended particles and for treating wastewaters and sludges.

EP-A-071 050 discloses partially hydrolyzed polymers of N-vinylformamide. They contain from 90 to 10 mol % of vinylamine units and from 10 to 90 mol % of N-vinylformamide units. They are prepared by free-radical polymerization of N-vinylformamide and partial hydrolysis of the polymers in the presence of acids or bases. The polymers are used as retention and drainage aids and flocculents in papermaking and in the treatment of wastewaters and sludges.

EP-A-02 16 387 discloses means for increasing the dry strength of paper. These are water-soluble copolymers which contain vinylamine units and are obtainable by copolymerizing N-vinylformamide with monoethylenically unsaturated monomers selected from the group consisting of vinyl acetate, vinyl propionate, $C_1$–$C_4$-alkyl vinyl ethers, the esters, nitriles and amides of acrylic acid and methacrylic acid and N-vinylpyrrolidone and elimination of formyl from the copolymers. Preferably, copolymers of N-vinylformamide and vinyl acetate whose monomer units are each 30 to 100 mol % hydrolyzed are used in papermaking.

The preparation of modified polyvinylamines is also disclosed in the literature. Thus, for example, the water solubility of polyvinylamines is improved by grafting ethylene oxide or propylene oxide onto polyvinylamine, cf. Ikemura, Kobunshi Kagaku, 26 (288), (1969) 306–310.

U.S. Pat. No. 5,324,787 discloses modified polyvinylamines, which are obtainable by reacting at least 0.1 mol % of the amine units of polyvinylamine with a glycidyl ether compound. In the reaction, polyvinylamines made hydrophobic are obtained which are used as retention aids in papermaking.

The reaction of polyalkylenepolyamines and monoepoxides or polyepoxides for preparing water-dispersible reactive resins which contain epoxide groups and are used in coating materials is disclosed by U.S. Pat. No. 5,246,984 and U.S. Pat. No. 5,350,784.

It is an object of the present invention to provide novel substances.

We have found that this object is achieved according to the invention by polymers containing β-hydroxyalkylvinylamine units, which are obtainable by reacting polymers-containing vinylamine units with epoxides of the formula

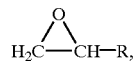

where R=$C_2$–$C_{28}$-alkyl, phenyl, $C_1$–$C_{18}$-alkylphenyl or $C_2$–$C_{18}$-alkenyl.

The present invention further relates to a process for preparing the above-described polymers containing β-hydroxyalkylvinylamine units, which comprises, reacting at least 0.1 mol % of the NH groups of polymers containing vinylamine units with epoxides of the formula

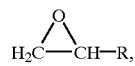

where R=$C_2$–$C_{28}$-alkyl, phenyl, $C_1$–$C_{18}$-alkylphenyl or $C_2$–$C_{18}$-alkenyl at above 70° C. The reaction is preferably carried out in aqueous solution at pH 8–13.

The above-described polymers containing β-hydroxyalkylvinylamine units are used as retention and drainage aids and flocculants and as fixatives in papermaking, as protective colloid for producing alkyldiketene dispersions or alkenylsuccinic anhydride dispersions, as emulsifier for producing aqueous filler suspensions and as corrosion inhibitor.

Polymers containing vinylamine units are disclosed, cf. for example U.S. Pat. No. 4,217,214, EP-A-0 071 050 and EP-A-0 216 387. These polymers are obtainable by copolymerizing open-chain N-vinylcarboxamides alone or together with other monoethylenically unsaturated monomers and then eliminating the formyl or alkylcarbonyl from the polymerized open-chain N-vinylcarboxamide units by the action of acids, bases or enzymes, with the formation of vinylamine units.

To prepare the polymers containing vinylamine units, one starts, for example, from open-chain N-vinylcarboxamides of the formula

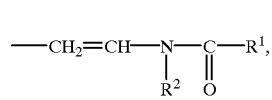  (I)

where $R^1$ and $R^2$ can be identical or different and are hydrogen or $C_1$–$C_6$-alkyl. Examples of suitable monomers are N-vinylformamide ($R^1$=$R^2$=H in formula I) N-vinyl-N-methylformamide, N-vinylacetamide, N-vinyl-N-methylacetamide, N-vinyl-N-ethylacetamide, N-vinyl-N-methylpropionamide and N-vinylpropionamide. To prepare the polymers, said monomers can be polymerized either alone, in a mixture among one another or together with other monoethylenically unsaturated monomers. Preferably, one starts from polymers of N-vinylformamide.

Suitable monoethylenically unsaturated monomers are all compounds which can be copolymerized with the open-chain vinylcarboxamides. Examples of these are vinyl esters of saturated carboxylic acids of 1–6 carbons, such as vinyl formate, vinyl acetate, vinyl propionate and vinyl butyrate. Further suitable comonomers are ethylenically unsaturated $C_3$–$C_6$-carboxylic acids, for example acrylic acid, methacrylic acid, maleic acid, crotonic acid, itaconic acid and vinylacetic acid and their alkali metal and alkaline earth metal salts, esters, amides and nitriles, for example methyl acrylate, methyl methacrylate, ethyl acrylate and ethyl methacrylate. Further suitable carboxylic esters are derived from glycols or from poly(alkylene glycols), where in each case only one OH group is esterified, e.g. hydroxyethyl acrylate, hydroxyethyl methacrylate, hydroxypropyl acrylate, hydroxybutyl acrylate, hydroxypropyl methacrylate, hydroxybutyl methacrylate and monoacrylates of poly (alkylene glycols) having a molar mass of from 500 to 10,000. Further suitable comonomers are esters of ethylenically unsaturated carboxylic acids with amino alcohols, such as dimethylaminoethyl acrylate, dimethylaminoethyl methacrylate, diethylaminoethyl acrylate, diethylaminomethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, the salts with mineral acids such as hydrochloric acid, sulfuric acid or nitric acid, the salts with organic acids such as formic acid, acetic acid, propionic acid or sulfonic acid, or in quaternized form. Examples of suitable quaternizing agents are dimethyl sulfate, diethyl sulfate, methyl chloride, ethyl chloride or benzyl chloride.

Further suitable comonomers are amides of ethylenically unsaturated carboxylic acids, such as acrylamide, methacrylamide and N-alkylmono- and -diamides of monoethylenically unsaturated carboxylic acids having alkyl radicals of 1–6 carbon atoms, e.g. N-methylacrylamide, N,N-dimethylacrylamide, N-methylmethacrylamide, N-ethylacrylamide, N-propylacrylamide and tert-butylacrylamide, and also basic (meth)acrylamides, such as dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Compounds further suitable as comonomers are N-vinylpyrrolidone, N-vinylcaprolactam, acrylonitrile, methacrylonitrile, N-vinylimidazole and substituted N-vinylimidazoles, such as N-vinyl-2-methylimidazole, N-vinyl-4-methylimidazole, N-vinyl-5-methylimidazole, N-vinyl-2-ethylimidazole, and N-vinylimidazolines, such as vinylimidazoline, N-vinyl-2-methylimidazoline, and N-vinyl-2-ethylimidazoline. N-vinylimidazoles and N-vinylimidazolines, in addition to the form of the free bases, are also used in a form neutralized with mineral acids or organic acids or in quaternized form, being preferably quaternized with dimethyl sulfate, diethyl sulfate, methyl chloride or benzyl chloride.

In addition, suitable comonomers are monomers containing sulfo groups, such as vinylsulfonic acid, allylsulfonic acid, methylallylsulfonic acid, styrenesulfonic acid, the alkali metal or ammonium salts of these acids, or 3-sulfopropyl acrylate.

The copolymers also include terpolymers and those polymers which additionally contain at least one further copolymerized monomer.

To prepare copolymers containing vinylamine units, one preferably starts from homopolymers of N-vinylformamide or from copolymers which contain copolymerized N-vinylformamide and vinyl formate, vinyl acetate, vinyl propionate, acrylonitrile or N-vinylpyrrolidone.

The above-described polymers are converted by the action of acids, bases or enzymes into polymers containing vinylamine units, by elimination of the group

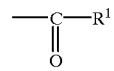
(II)

from the copolymerized monomers of the above-specified formula I and with formation of units of the formula

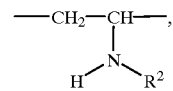
(III)

in which $R^2$ has the meaning specified in formula (I).

The copolymers comprise, for example from 99 to 1 mol % of N-vinylcarboxamide of the formula I and from 1 to 99 mol % of other monoethylenically unsaturated monomers copolymerizable therewith.

The homopolymers of the N-vinylcarboxamide of the formula I and their copolymers can be from 0.1 to 100, preferably from 10 to 100, mol % hydrolyzed. In most cases, the homo- and copolymers having a degree of hydrolysis of from 50 to 90 mol %, which is equivalent to their content of vinylamine units. In the case of copolymers which contain copolymerized vinyl esters, in addition to the hydrolysis of the N-vinylformamide units, hydrolysis of the esters groups with formation of vinyl alcohol units can occur. This is the case, in particular, if the copolymers are hydrolyzed in the presence of sodium hydroxide solution. Copolymerized acrylonitrile is likewise chemically modified in the hydrolysis, forming, for example, amide groups or carboxyl groups.

The novel polymers are prepared by reacting polymers containing vinylamine units with epoxides of the formula

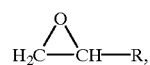
(IV)

where $R=C_2-C_{28}$-alkyl, phenyl, $C_1-C_{18}$-alkylphenyl or $C_2-C_{18}$-alkenyl.

The above-specified epoxides are known. If the substituent R in the formula specified for the epoxides is alkyl, this can be a straight-chain, branched or cyclic alkyl. If the substituent R is alkenyl, it comprises both straight-chain and branched alkenyls. Preferably, use is made of epoxides of the above-specified formula which contain from 12 to 20 carbons.

The above-specified epoxides are reacted with polymers containing vinylamine units at above 70° C. The reaction is preferably carried out in a solvent. Examples of suitable solvents are $C_1-C_4$-alcohols, tetrahydrofuran, dioxane, dimethylformamide and water. Preferably, the reaction is carried out in aqueous solution. The temperatures in the reaction are, for example, from 70 to 180° C. and are preferably in the range from 75 to 100° C. The reaction is preferably carried out in aqueous solution at a pH above 7, e.g. in the range from 8 to 13, in particular from 9 to 11. The concentration of the reaction partners in the aqueous solution or in another suitable solvent is from 1 to 60, preferably from 10 to 40, % by weight. The reaction is terminated after from 30 to 180 min, for example, in the temperature range from 80 to 95° C. If the reaction is performed in aqueous solution at above 100° C., pressure-tight sealed apparatuses are employed.

The reaction products obtained are modified polyvinylamines which contain β-hydroxyalkylvinylamine units of the structure

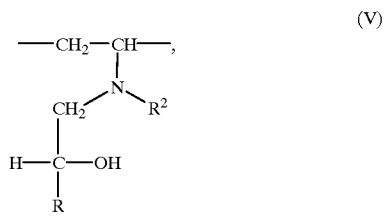

where R=$C_2$–$C_{28}$-alkyl, phenyl, $C_1$–$C_{18}$-alkylphenyl or $C_2$–$C_{18}$-alkenyl and
$R^2$=H, $C_1$–$C_6$-alkyl.

At least 0.1 mol % of the NH groups of the polymers containing vinylamine units are reacted with epoxides of the formula IV, so that the novel polymers contain at least 0.1 mol % of units of the formula V. Customarily, to prepare the novel polymers, at least 10 mol % of the NH groups of the polymers containing vinylamine units are reacted with epoxides of the formula IV. Preferably, from 50 to 90 mol % of the NH groups of the polymers containing vinylamine units are reacted with epoxides of the formula IV. Epoxides of the formula IV which contain from 12 to 20 carbons per molecule are preferred.

If polyvinylamines prepared by hydrolyzing the polymers containing N-vinylformamide units are reacted with the epoxides of the formula IV, vinylamine units which have a primary amino group are obtained. Compounds of this type can replace both primary amino hydrogens when reacted with epoxides of the formula IV. Polymers are then obtained containing units of the formula

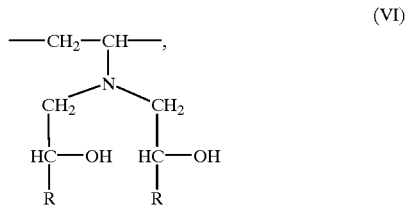

where R=$C_2$–$C_{28}$-alkyl, phenyl, $C_1$–$C_{18}$-alkylphenyl or $C_2$–$C_{18}$-alkenyl.

Preferably, R in the formulae V and VI is $C_{10}$–$C_{16}$-alkyl.

The modified polyvinylamines contain units of the formula VI in amounts, e.g. up to about 50 mol %, preferably from 5 to 25 mol %.

If partially hydrolyzed N-vinylcarboxamides are used in the reaction with the epoxides of the formula IV, polymers are obtained which, in addition to units of the structure V and, if appropriate, structure VI, contain units of unhydrolyzed vinylcarboxamides. If copolymers of, for example, N-vinylformamide and vinylformate, vinylacetate or vinylpropionate are used, depending on the hydrolysis conditions, copolymers are obtained which contain the vinylformate, vinylacetate and vinylpropionate units and also the corresponding hydrolysis products of these units, that is vinyl alcohol units. Particular preference is given to polymers which contain amine units and units of the formula V, vinylamine units, N-vinylformamide units and units of the formula V, vinylamine units, vinyl alcohol units and units of the formula V or vinylamine units, vinyl propionate units with or without vinyl alcohol units, and units of the formula V.

The content of units of the formula V in the novel polymers is at least 0.1 mol % and is usually in the range from 30 to 100, preferably from 50 to 95, mol %. The novel polymers have molar masses $M_w$ (determined by the light scattering method) from 500 to 50 million, preferably from 10,000 to 2 million. The K values of the novel polymers are from 10 to 300, preferably from 30 to 200. The K values are determined according to H. Fikentscher in 5% strength aqueous sodium chloride solution at pH 7, 25° C. and a polymer concentration of 0.5% by weight, cf. Cellulose-Chemie, Volume 13, (1932) 58–64 and 71–74.

The novel polymers containing β-hydroxyalkylvinylamine units are used as retention and drainage aids and flocculants in papermaking. They are suitable, in particular, as processing aids in the drainage of paper pulps containing interfering substances. They can be used for manufacturing all known quality grades of paper, paper board and cardboard. The paper grades can be manufactured from a multiplicity of various types of fibrous materials, for example from sulfite pulp or sulfate pulp in bleached or unbleached state, ground wood, pressure ground wood, CTMP or waste paper. Retention and drainage aids and flocculents are usually added in amounts of from 0.01 to 0.1% by weight, based on dry fibrous material.

The novel polymers are suitable, in addition, as fixatives in papermaking. A good fixing action is especially important if the paper pulps contain relatively large amounts of interfering substances, e.g. if pulps containing waste paper have interfering amounts of resins, polymeric binders and other interfering solids. Fixatives are usually used in amounts of from 0.01 to 1% by weight, based on dry paper pulp.

The novel polymers containing β-hydroxyalkylvinylamine units are suitable, in addition, as protective colloid for producing alkyldiketene dispersions or alkenylsuccinic anhydride dispersions. They permit, for example, the production of aqueous alkyldiketene dispersions having an alkyldiketene content of, for example, from 15 to 25% by weight. The dispersions have a relatively low viscosity and are storage-stable.

The novel polymers are suitable, in addition, as emulsifier for producing aqueous filler suspensions which are used, for example, in the production of filler-containing papers. Examples of suitable fillers are clay, chalk, titanium dioxide and kaolin. The amounts of emulsifier used to produce the filler suspensions are, for example, from 0.1 to 2, preferably from 0.5 to 1.5% by weight, based on the suspension. A further area of application for the novel polymers is their action as corrosion inhibitors for metals.

EXAMPLES

Preparation of the β-hydroxyalkylvinylamines

A stirred reactor which has a capacity of 1 liter and is equipped with cooler, thermometer and feed apparatus is charged with an aqueous solution of one of the polymers specified in the table at a pH of 11 to 13 and the respective amount of epoxide specified in the table is added at room temperature each time in the course of 10 minutes. The reaction mixture is then heated to 90° C. and stirred for 2 to 3 hours at room temperature. The reaction is then terminated. The reaction mixture is cooled and the water used as solvent is removed under reduced pressure. The reaction products were characterized with respect to their content of β-hydroxyalkylvinylamine units by determining the amine number and OH number by known methods. The degree of conversion was additionally determined by polyelectrolyte titration, cf. D. Horn, Prog. Colloid & Polymer Sci. 65, 251 (1978). As polymers containing vinylamine units, use was made of the following substances:

Polymer 1

Polyvinylamine prepared by polymerizing N-vinylformamide and subsequent complete hydrolysis of the polymerized vinylformamide units to give vinylamine units. The K value of the polyvinyl amine was 30.

Polymer 2

Polyvinylamine prepared by complete hydrolysis of polyvinylformamide and which had a K value of 86.6.

Polymer 3

Polyvinylamine prepared by complete hydrolysis of polyvinylformamide and which had a K value of 146.

Polymer 4

Partially hydrolyzed polyvinylformamide prepared according to EP-A-0 71 050. The degree of hydrolysis of the polyvinyl-formamide was 50 mol %, and the K value was 30.

Polymer 5

Completely hydrolyzed polymer of 70% N-vinylformamide and 30% vinyl acetate. The polymer contains 70 mol % of vinylamine units and 30 mol % of vinyl alcohol units. The K value of the polymer was 90.

Polymer 6

Polymer of 80 mol % of vinylamine units and 20 mol % of vinyl propionate units prepared by complete hydrolysis of the copolymerized vinylformamide groups of a vinylformamide-vinyl propionate polymer. The K value of the polymer was 60.

TABLE

| Example | Polymer No. | K value of the polymer used | Mass of polymer used [g] | R = (in R—CH₂—CH₂ epoxide) | Mass of epoxide used [g] | Content of β-hydroxyalkylvinyl-amine units [mol %] | Reaction time [min] | K value of the reaction product |
|---|---|---|---|---|---|---|---|---|
| 1 | 1 | 30 | 150 | C-8 | 63 | 52.2 | 120 | 45.2 |
| 2 | 1 | 30 | 250 | C-10 | 82 | 23.8 | 150 | 44.0 |
| 3 | 1 | 30 | 129 | phenyl | 50 | 48.6 | 100 | 42.3 |
| 4 | 1 | 30 | 130 | C-6 | 16.3 | 18.4 | 180 | 37.5 |
| 5 | 1 | 30 | 150 | C-6 | 9.4 | 10.8 | 180 | 35.2 |
| 6 | 1 | 30 | 150 | C-6 | 32.7 | 31.7 | 180 | 41.7 |
| 7 | 1 | 30 | 120 | C-6 | 32.7 | 49.2 | 180 | 48.0 |
| 8 | 1 | 30 | 100 | C-6 | 62.7 | 101 | 30 | 49.1 |
| 9 | 2 | 86.6 | 150 | C-16 | 16.3 | 32.4 | 180 | 99.6 |
| 10 | 3 | 146 | 247 | C-12 | 51.4 | 98.6 | 30 | 182 |
| 11 | 4 | 30 | 183 | C-8 | 194 | 103 | 120 | 37.2 |
| 12 | 5 | 90 | 150 | C-8 | 67 | 34.7 | 120 | 96.8 |
| 13 | 6 | 60 | 120 | C-8 | 54 | 38.3 | 120 | 75.0 |

What is claimed is:

1. A polymer containing β-hydroxyalkylvinylamine units, which is obtained by reacting a polymer containing vinylamine units with epoxides of the formula

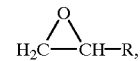

where R=$C_2$–$C_{28}$-alkyl, phenyl, $C_1$–$C_{18}$-alkylphenyl or $C_2$–$C_{18}$-alkenyl.

2. A polymer containing β-hydroxyalkylvinylamine units as claimed in claim 1, wherein at least 0.1 mol % of the NH groups of the polymer containing vinylamine units is reacted with epoxides.

3. A polymer containing β-hydroxyalkylvinylamine units as claimed in claim 1, wherein at least 10 mol % of the NH groups of the polymer containing vinylamine units are reacted with epoxides.

4. A polymer containing β-hydroxyalkylvinylamine units as claimed in claim 1, wherein from 50 to 95 mol % of the NH groups of the polymer containing the vinylamine units are reacted with epoxides.

5. A polymer containing β-hydroxyalkylvinylamine units as claimed in claim 1, wherein the epoxides contain from 12 to 20 carbons per molecule.

6. A polymer containing β-hydroxyalkylvinylamine units as claimed in claim 1, wherein the polymer containing vinylamine units used in the reaction has a K value of at least 10 (determined according to H. Fikentscher in 5% strength by weight aqueous sodium chloride solution at 25° C.) and a polymer concentration of 0.5% by weight.

7. A process for preparing the polymer containing β-hydroxyalkylvinylamine units as claimed in claim 1, which comprises reacting at least 0.1 mol % of the NH groups of a polymer containing vinylamine units with epoxides of the formula

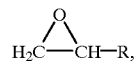

where R=$C_2$–$C_{28}$-alkyl, phenyl, $C_1$–$C_{18}$-alkylphenyl or $C_2$–$C_{18}$-alkenyl, at above 70° C.

8. A process as claimed in claim 7, wherein the reaction is carried out in aqueous solution at pH 8–13.

9. A process as claimed in claim 7, wherein epoxides are used which contain from 12 to 20 carbons per molecule.

* * * * *